United States Patent [19]

Tung

[11] 4,383,106

[45] * May 10, 1983

[54] HIGH MELT STRENGTH ELASTOMERIC COPOLYESTERS

[75] Inventor: William C. T. Tung, Tallmadge, Ohio

[73] Assignee: The Goodyear Tire & Rubber Company, Akron, Ohio

[ * ] Notice: The portion of the term of this patent subsequent to Mar. 3, 1998, has been disclaimed.

[21] Appl. No.: 304,273

[22] Filed: Sep. 21, 1981

[51] Int. Cl.$^3$ ...................... C08G 63/66; C08G 63/18
[52] U.S. Cl. .................................. 528/295.3; 528/296
[58] Field of Search ............................. 528/295.3, 296

[56] References Cited

U.S. PATENT DOCUMENTS

| | | | |
|---|---|---|---|
| 3,576,773 | 4/1971 | Vaginay | 528/295.3 |
| 4,217,440 | 8/1980 | Barkey | 528/296 |
| 4,254,001 | 3/1981 | Tung | 528/295.3 |
| 4,264,751 | 4/1981 | Scheibelhoffer | 528/296 |

Primary Examiner—Ronald W. Griffin
Attorney, Agent, or Firm—Daniel J. Hudak; Bruce Hendricks

[57] ABSTRACT

An elastomeric copolyester resin having high melt strength and capable of being blow-molded. The copolyester resin is made by adding to the polymerizing or initial mixture small amounts of a heat stable chain branching agent having three or more carboxyl groups, hydroxyl groups, or combinations thereof. The copolyester resin contains units of terephthalic acid, butane diol, polytetramethylene glycol, and dimer acid.

11 Claims, No Drawings

HIGH MELT STRENGTH ELASTOMERIC COPOLYESTERS

TECHNICAL FIELD

The present invention relates to high melt strength copolyester resins having elastomeric properties and to articles prepared therefrom such as blow-molded bellows, boots, bottles, containers, and the like.

BACKGROUND ART

Elastic polyester resins made of certain ordered block copolymers are disclosed in U.S. Pat. Nos. 3,023,192 and 3,954,689.

U.S. Pat. No. 4,013,624 discloses elastomeric properties obtained in polyesters having branched chain compounds in their structure.

U.S. Pat. No. 3,890,279 relates to polyesters having side chains therein.

U.S. Pat. No. 4,254,001 relates to elastomeric copolyester resins which can be made into films, fibers, and molded products.

U.S. Pat. Nos. 3,763,109 and 3,766,146 relate to copolyesters having long chain ester units and short chain ester units therein.

None of the above prior art patents discloses elastomeric copolyester resins which have been made utilizing chain branching agents to produce a high melt strength resin which are capable of being extrusion blow-molded. Moreover, the elastomeric copolyesters of the present invention contain significant amounts of polyalkylene groups within the polymer chain.

DISCLOSURE OF INVENTION

It is therefore an object of the present invention to produce an elastomeric copolyester resin having high melt strength.

It is yet another object of the present invention to produce high melt strength elastomeric copolyester resins, as above, utilizing dialkyl esters.

It is yet another object of the present invention to produce high melt elastomeric copolyester resins, as above, wherein chain branching agents having three or more carboxyl units, hydroxyl units, or combinations thereof, are utilized in the preparation of the resins.

It is yet another object of the present invention to produce high melt strength elastomeric copolyester resins, as above, which can be readily blow-molded and made into articles.

It is yet another object of the present invention to produce high melt strength elastomeric copolyester resins, as above, which resins have a very good melt strength index.

In general, these objects are accomplished by providing a high melt strength, elastomeric, copolyester, comprising:

the polymeric reaction product of a mixture of reactants of
(a) terephthalic acid or a 1 to 4 carbon atom dialkyl ester thereof;
(b) a dimer acid;
(c) a poly(tetramethylene oxide) glycol having a molecular weight of from about 600 to about 2,000;
(d) 1,4-butane diol; and
(e) a chain branching agent having the formula

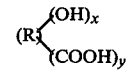

where R is an alkyl having from 4 to 20 carbon atoms, a cycloalkyl having from 4 to 10 carbon atoms, an aromatic having from 6 to 10 carbon atoms, or an alkyl substituted aromatic having from 7 to 15 carbon atoms, where x is 0 to at least 3 and up to 6, where y is 0 to at least 3 and up to 6, and where x plus y is at least 3 and up to 12;

the amount of said terephthalic acid or said dialkyl ester thereof ranging from about 85.0 mole percent to about 99.9 mole percent and the amount of said dimer acid ranging from about 0.1 mole percent to about 15.0 mole percent, said percentages being based upon the total number of moles of said acid constituents or reactive equivalents thereof in said mixture, the amount of said poly(tetramethylene oxide) glycol in said mixture ranging from about 2.0 to about 12.0 mole percent and the amount of said 1,4-butane diol ranges from about 88.0 mole percent to about 98.0 mole percent, and additionally including a molar excess of said 1,4-butane diol ranging from about 5.0 to about 120 percent, said mole percentages of said excess 1,4-butane diol being based upon the total number of moles of said glycol and said 88.0 to said 98.0 mole percent of said 1,4-butane diol, so that the molar ratio of all of said glycol constituents to all of said acid constituents or their reactive equivalents ranges from about 1.05 to about 2.1, and from about 0.05 to about 1.0 parts by weight per 1,000 parts of said copolyester produced of said chain branching agent.

BEST MODE FOR CARRYING OUT THE INVENTION

The high melt strength copolyesters of the present invention can be made by utilizing typical or conventional procedures for making high molecular weight polyesters, including ester interchange, esterification, and polycondensation or a combination of these processes. They are essentially random polymers and are copolyesters in that they contain units of different polyester-forming materials within the polymer chain.

The amount of terephthalic acid or lower $C_1$ to $C_4$ dialkyl esters thereof ranges from about 99.9 to about 85.0 mole percent, with the amount of dimer acid ranging from about 0.1 to about 15 mole percent, said percentages being based on the total number of moles of said acid constituents or reactive equivalents thereof in said mixture. Preferably, the amount of terephthalic acid or the $C_1$ to $C_4$ dialkyl ester thereof ranges from about 86.8 to about 99.5 mole percent, and from about 0.5 to about 13.2 mole percent of the dimer acid. The dialkyl esters are preferred in the present invention with dimethyl terephthalate being especially preferred. The amount of poly(tetramethylene oxide)glycol in the mixture, having a molecular weight average of from about 600 to about 2,000, ranges from about 2.0 to about 12.0 mole percent and the amount of 1,4-butane diol ranges from about 98.0 to about 88.0 mole percent. A molar excess of said 1,4-butane diol; that is, an amount in addition to the above-noted 88.0 to 98.0 mole percent of said 1,4-butane diol and said 2.0 to 12.0 mole percent of said poly(tetramethylene oxide)glycol, is utilized in an amount of from about 5.0 to about 120.0 percent. In other words, although a mole amount of glycol and diol is used approximately equal to the mole amount of the acids, a further amount of 1,4-butane diol (5 to 120 mole percent) is also used to ensure complete reaction of the acids. Thus, the total molar amount of polyhydric alcohols is 1.05 to 2.2 as great as the total molar amount of the acids. This excess is employed in order to ensure reasonable rates of reaction between the glycol constituents and the acid constituents or the reactive equivalents thereof. As a result of the use of this excess of the 1,4-butane diol, the molar ratio of all the glycol constituents to all of the acid constituents or their reactive equivalents in the mixture will range from about 1.05:1.0 to about 2.20:1.0.

The dimer acid containing a total of 36 carbon atoms useful in preparing the high melt strength copolyesters constituting the present invention is itself prepared from an unsaturated fatty acid containing 18 carbon atoms such as linoleic and linolenic acid or the monohydric alcohol esters thereof. The actual preparation and structure of dimerized $C_{18}$ fatty acids are described in J.A.C.S. 66,84 (1944) and U.S. Pat. No. 2,347,562, both of which are fully incorporated herein by reference. Several different grades of dimer acid are available from commercial sources and these differ from each other primarily in the amount of the monobasic and trimer acids fractions and the degree of unsaturation. It is preferred, for purposes of this invention, that the dimer acid be substantially free of the monobasic and trimer acids fractions and essentially completely saturated, and be added after the esterification or the transesterification reaction. Two different grades of dimer acid, which are useful in preparing the copolyesters herein described and meet the above requirements are available from Emery Industries, Inc. under the trade name Empol 1010 dimer acid, typically containing 97 percent dimer acid, 3 percent trimer acid, and essentially no monobasic acids and extremely low unsaturation, and Empol 1014 typically containing 95 percent, 4 percent, and 1 percent of dimer, trimer, and monobasic acids, respectively.

It has been unexpectedly found that the addition of small amounts of various chain branching agents to the initial mixture; that is, the esterification or the transesterification mixture, result in a copolyester resin which has good high melt strength properties and thus can be utilized for making blow-molded articles therefrom. The chain branching agents can generally be any organic compound having at least three carboxyl groups, or at least three hydroxyl groups, or at least three groups of any combination thereof, and which are heat stable. By heat stable, it is meant organic compounds which do not decompose at temperatures of approximately 270° C. or less. The chain branching agents can be represented by the general formula

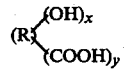

where x is from 0 to at least 3 and up to 6 and y is from 0 to at least 3 and up to 6, and x plus y is 3 or more with a maximum of 12. R is an alkyl having from 4 to 20 carbon atoms, a cycloalkyl having from 4 to 10 carbon atoms, an aromatic having from 6 to 10 carbon atoms, an alkyl substituted aromatic having from 7 to 15 carbon atoms, and combinations thereof. A desired chain branching agent is trimethanol propane, and preferably pentaerythritol. The amount of the chain branching agents desirably ranges from about 0.05 to about 1.0 parts per weight per 1,000 parts by weight of resultant or final copolyester polymer made or produced, and preferably from about 0.2 to about 0.4 parts by weight. Small amounts of the chain branching agent are utilized in that if large amounts were added to the mixture, a gel would result in the reactor.

The elastomeric, random copolyesters of the present invention and derived from the reaction mixtures defined hereinabove including the chain branching agent, are prepared by conventional and well known techniques used in preparing high molecular weight polyesters. In general, the copolyesters are prepared by first subjecting the mixture of reactants to elevated temperatures under an inert gas atmosphere at atmospheric or superatmospheric pressures in the presence of a catalyst to promote the esterification or combined transesterification/esterification reactions, depending on the nature of the starting materials, between the glycol constituents and the acid constituents or reactive equivalents thereof comprising said mixtures. Known catalysts useful in promoting these reactions include the zinc, magnesium, calcium, manganese, lead and titanium containing compounds. The amount of catalyst used can be varied over a wide range. Generally, the amount used will be in the range of from about 0.005 to about 0.03 percent by weight based on the amount of reactants used. The temperature normally employed to affect the esterification or combined transesterification/esterification reactions will generally range from about 150° C. to about 240° C. and preferably from about 190° C. to about 230° C.

Following completion of the esterification or combined transesterification/esterification reaction, the low molecular weight oligomer product produced thereby is subjected to polycondensation. The polycondensation reaction will be carried out at temperatures ranging from about 220° C. to about 280° C. and preferably from about 240° C. to about 270° C. at pressures below 15 and preferably below 1 millimeter of mercury (mmHg) pressure in the presence of a polycondensation catalyst such as the known antimony, titanium, iron, zinc, cobalt, lead, manganese, niobium or germanium catalysts.

The intrinsic viscosities of the polyesters of the present invention, as determined in a 60/40 by volume mixed solvent system of phenol and tetrachloroethane at 30° C., range from about 0.90 to about 1.5 and preferably from about 0.9 to about 1.3.

The invention will be better understood by the following examples which illustrate the preparation of the copolymers and the effect of the chain branching agent upon the melt strength index. The melt strength index (MSI) is equal to $T_1/T_2$ wherein $T_1$ is the time for an extruded tube (parison) to drop through the first four inches and $T_2$ is the time for the tube to travel the second four inches. The lower the MSI number, the higher the melt strength of a given polymer with MSI equal to 1 being the ideal case. In this invention, an MSI of less than 4.0 is preferred.

EXAMPLE I 120.5 lb. of dimethyl terephthalate (DMT), 71.6 lb. of butane diol (BD), 12.5 lb. of Polymeg 1000, poly(tetramethylene oxide)glycol having a molecular weight of about 1,000, and produced by the Quaker Oats Co., 1.5 lb. of Irganox 1010, tetrakis[methylene-3-(3′,5′-di-tert-butyl-4′-hydroxy-phenyl propionate]methane, manufactured by Ciga-Geiby, and 0.9 lb. of tetrabutyltitanate glycolate (60 PPM Ti) (7.17 percent TBT in EG) were charged in a reactor. The mixture was heated under $N_2$ atmosphere to carry out the transesterification reaction with a batch temperature of 174° C.–215° C. After all the by-product methanol was distilled out, 1.8 lb. of dimer acid (Empol 1014) was added. The resultant mixture was further reacted at 215° C. for one hour. The pressure of the reactor was slowly reduced while temperature was raised to 250° C. The polymerization was carried out at 254° C. and 0.5 mm Hg pressure. Three hours later, the copolyester was discharged and the polymer had a melt strength index of 11.07.

EXAMPLE II

Same charge composition as that given in Example I with an addition of 0.2 parts by weight of pentaerythritol per 1000 parts by weight of the final polymer formed was added to the initial mixture. The sample production process was carried out as that given in Example I. The final product has much higher melt strength than the control (Example I), with an MSI reading of 3.44.

EXAMPLE III 84.8 lb. of DMT, 49.4 lb. of 1,4-butane diol, 45 lb. of Polymeg 1000, 1.5 lb. of Irganox 1010, and 60 ppm Ti catalyst (TBT) were used in the transesterification reaction and 12 lb. of dimer acid was used. All the processing conditions were similar to that of Example I. The final copolyester elastomer had an MSI of 6.73.

EXAMPLE IV

Both the charge weights, composition and processing conditions were the same as that of Example III. 0.2 parts pentaerythritol by weight per thousand parts by weight of final polymer formed, was added with the transesterification reactants at the beginning of the processing. The final product had a melt strength index of 3 to 4 which was much higher than the control (Example III).

As apparent from the above examples, the addition of 0.2 parts of pentaerythritol per 1,000 parts by weight of the polymer formed as utilized in Example II resulted in a very large increase in the melt strength as compared to the control of Example I. Similarly, the melt strength of Example IV was much better than Example III. Both Examples II and IV were extruded into a parison and blow-molded into a 3 inch by 8 inch bellow. Both examples were readily blow-molded without any difficulty whatsoever. In contrast, the product of Examples I and III had a low melt strength and could not be blow-molded into a bellow, because of their low or insufficient melt strength to support its own weight prior to blow molding.

The high melt strength copolyester resins of the present invention can be modified somewhat by the incorporation of conventional compounds such as plasticizers, lubricants, fillers, pigmenting agents, and stabilizers. The stabilizers added provide additional stability against the deteriorating effects of heat of light. Phenols, amines, oximes, and salts of metals are suitable stabilizers.

The copolyesters of the present invention generally have a melting point in the range of from about 180° C. to about 220° C. The melting point of the copolyester as utilized in the specification is the minimum temperature at which a sample of polymer leaves a wet molten trail as it is drawn across the surface of a heated block of aluminum. Sometimes this temperature is called a polymer stick temperature.

In addition to being utilized for making bellows or boots, as for use in various automotive components, bottles or containers via blow-molding, the copolymers of the present invention can also be utilized as yarn, low denier filaments, and thus can be utilized in two-way stretch, woven, or knitted articles. It can also be utilized in non-woven fabrics as bonding materials and paper and in the non-woven fabrics.

While in accordance with the patent statutes, the best mode and preferred embodiments have been set forth, it will be apparent to those skilled in the art that various changes and modifications can be made without departing from the spirit or scope of the invention. Accordingly, the invention is measured by the scope of the attached claims.

What is claimed is:

1. A high melt strength, elastomeric, copolyester, comprising:
   the polymeric reaction product of
   (a) terephthalic acid or a 1 to 4 carbon atom dialkyl ester thereof;
   (b) a dimer acid;
   (c) a poly(tetramethylene oxide)glycol having a molecular weight of from about 600 to about 2,000;
   (d) 1,4-butane diol; and
   (e) a chain branching agent having the formula

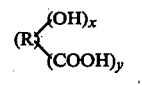

where R is an alkyl having from 4 to 20 carbon atoms, a cycloalkyl having from 4 to 10 carbon atoms, an aromatic having from 6 to 10 carbon atoms, or an alkyl substituted aromatic having from 7 to 15 carbon atoms, where x is 0 to at least 3 and up to 6, where y is 0 to at least 3 and up to 6, and where x plus y is at least 3 and up to 12,
   the amount of said terephthalic acid or said dialkyl ester thereof ranging from about 85.0 mole percent to about 99.9 mole percent, and the amount of said dimer acid ranging from about 0.1 mole percent to about 15.0 mole percent, said percentages being based upon the total number of moles of said acid constituents or reactive equivalents thereof,
   the amount of said poly(tetramethylene oxide)glycol ranging from about 2.0 to about 12.0 mole percent and the amount of said 1,4-butane diol ranging from about 88.0 mole percent to about 98.0 mole percent, and
   additionally including a molar excess of said 1,4-butane diol ranging from about 5.0 to about 120 percent, said mole percentages of said excess 1,4-butane diol being based upon the total number of moles of said glycol and said 88.0 to said 98.0 mole percent of said 1,4-butane diol so that the molar ratio of all of said glycol constituents to all of said acid constituents or their reactive equivalents ranges from about 1.05 to about 2.2, and from about 0.05 to about 1.0 parts by weight per 1,000 parts of said copolyester produced of said chain branching agent.

2. A high melt strength elastomeric copolyester according to claim 1, having an intrinsic viscosity of from about 0.9 to about 1.5 as determined in a 60/40 by volume mixed solvent system of phenol and tetrachloroethane at 30° C.

3. A high melt strength elastomeric copolyester according to claim 2, wherein the melt strength index is 4.0 or less.

4. A high melt strength elastomeric copolyester according to claim 3, wherein the amount of said terephthalic acid or dialkyl esters thereof range from about 99.5 to about 86.8 mole percent and said dimer acid ranges from about 0.5 to about 13.2 mole percent.

5. A high melt strength elastomeric polyester according to claim 4, wherein said reaction product is from dimethyl terephthate, dimer acid, poly(tetramethylene oxide)glycol having a molecular weight of about 1,000, 1,4-butane diol, wherein the amount of said chain branching agent is from about 0.2 to about 0.4 parts per thousand, and wherein the intrinsic viscosity is from about 0.9 to about 1.3.

6. A high melt strength elastomeric polyester according to claim 5, wherein said chain branching agent is selected from the group consisting of trimethanol propane, pentaerythritol, and combinations thereof.

7. A high melt strength elastomeric copolyester according to claims 1, 3, 5, or 6, in the form of a molded product.

8. A high melt strength elastomeric copolyester according to claims 1, 3, 5, or 6, in the form of a blow-molded product.

9. A high melt strength elastomeric copolyester according to claims 1, 3, 5, or 6, in the form of a filament.

10. A high melt strength elastomeric copolyester according to claims 1, 3, 5 or 6, in the form of a blow-molded bottle.

11. A high melt strength elastomeric copolyester according to claims 1, 3, 5, or 6, in the form of a bellow or boot.

* * * * *